US007248676B2

(12) United States Patent
Visser et al.

(10) Patent No.: US 7,248,676 B2
(45) Date of Patent: Jul. 24, 2007

(54) APPARATUS AND METHOD FOR PERSONALIZED CALL ACKNOWLEDGEMENT

(75) Inventors: Roger E. Visser, Bellevue, WA (US); Bradley O. Hargrave, Irvine, CA (US)

(73) Assignee: Applied Voice & Speech Technologies, Inc., Foothill Ranch, CA (US)

( * ) Notice: Subject to any disclaimer, the term of this patent is extended or adjusted under 35 U.S.C. 154(b) by 0 days.

(21) Appl. No.: 10/932,745

(22) Filed: Sep. 2, 2004

(65) Prior Publication Data

US 2005/0232400 A1   Oct. 20, 2005

Related U.S. Application Data

(60) Provisional application No. 60/562,631, filed on Apr. 14, 2004.

(51) Int. Cl.
*H04M 1/64* (2006.01)
(52) U.S. Cl. ................ 379/88.21; 379/88.19; 379/93.35; 379/201.03; 370/356
(58) Field of Classification Search ........... 379/201.03, 379/201.02, 88.22, 88.23, 93.35, 67.1, 88.19, 379/88.21; 370/356
See application file for complete search history.

(56) References Cited

U.S. PATENT DOCUMENTS

| 5,276,731 A | 1/1994 | Arbel et al. |
| 5,604,790 A | 2/1997 | Grimes |
| 5,703,937 A | 12/1997 | Saltzman |
| 5,724,408 A | 3/1998 | Morganstein |
| 5,892,814 A | 4/1999 | Brisebois et al. |
| 5,963,626 A | 10/1999 | Nabkel |
| 5,991,367 A | 11/1999 | Robuck |
| 6,026,156 A | 2/2000 | Epler et al. |
| 6,052,438 A | 4/2000 | Wu et al. |
| 6,266,399 B1 | 7/2001 | Weller et al. |
| 6,631,181 B1 | 10/2003 | Bates et al. |
| 6,724,872 B1 * | 4/2004 | Moore et al. ............ 379/93.35 |
| 6,829,335 B2 * | 12/2004 | Colemon ................. 379/88.22 |
| 6,853,714 B2 * | 2/2005 | Liljestrand et al. .... 379/201.03 |
| 6,882,641 B1 * | 4/2005 | Gallick et al. ............. 370/356 |
| 6,975,707 B2 * | 12/2005 | Memos ..................... 379/67.1 |
| 2004/0037408 A1 | 2/2004 | Zandt et al. |

\* cited by examiner

*Primary Examiner*—Gerald Gauthier
(74) *Attorney, Agent, or Firm*—Anatoly S. Weiser, Esq.

(57) ABSTRACT

A method of operating a call management system enables a subscriber to acknowledge a call, without taking the call. When the system receives the call, it identifies the called subscriber, obtains caller information, and presents the caller information to the subscriber when notifying the subscriber of the pending call. Caller information is information relating to the caller or to the call, such as the caller's name and telephone number. If the subscriber chooses to acknowledge the call, the system records an acknowledgement message from the subscriber. The system then plays the acknowledgement message to the caller. After playing the acknowledgement message, the system offers the caller an opportunity to leave a message for the subscriber. The system may allow such message exchange between the caller and subscriber to continue, enabling the subscriber to acknowledge the caller's additional messages, and the caller to leave messages in response to the acknowledgements.

28 Claims, 5 Drawing Sheets

APPARATUS AND METHOD FOR PERSONALIZED CALL ACKNOWLEDGEMENT

CROSS-REFERENCE TO RELATED APPLICATION

This application claims priority benefit of provisional U.S. Patent Application Ser. No. 60/562,631, entitled APPARATUS AND METHOD FOR PERSONALIZED CALL ACKNOWLEDGEMENT IN CALL MANAGEMENT TELEPHONE ANSWERING SYSTEMS, filed Apr. 14, 2004, which application is hereby incorporated by reference.

FIELD OF THE INVENTION

The present invention relates generally to telecommunication systems, and, more particularly, to telephone call management systems.

BACKGROUND

Even with the relatively recent proliferation of email, instant messaging, and similar communication technologies, telephone services remain important to an average person or business. Indeed, it appears that the number of individual telephone lines in use is constantly increasing. The number and sophistication of feature functions available from both telephone systems and telephone service providers also continue to increase. Call answering, voice messaging, and automated attendant (auto attendant) are some of the more popular feature functions commonly offered by telephone systems and service providers.

An auto attendant system typically answers the incoming calls, greets the callers, and transfers the calls to selected extensions. Some auto attendant systems interact with the callers using, for example, dual tone multi-frequency (DTMF or touch-tone) key input. Other auto attendant systems accept voice input, which they process using automatic speech recognition. Still other systems can receive and process both DTMF and voice input. Representative auto attendant systems of all three types can support call screening. For example, an auto attendant system can request a caller to identify himself (or herself, as the case may be), record the caller's response, play the response to the called party, and allow the called party to accept or reject the call.

An auto attendant system's functionality can be further extended with a so-called "locate" feature, which allows the caller to reach the called party-subscriber at one or more programmable telephone numbers, such as the subscriber's home or mobile telephone numbers. CallXpress™ Call Manager product of the assignee of this invention and other products further extended this functionality to graphical user interface (GUI) screen pop-ups, and added other identification means, such as using the automatic number identification (ANI) number of a call to look up a name in a contact database in order to pop-up the caller's name on the subscriber's screen.

When the called party-subscriber chooses not to take the call, the caller generally does not have a simple and easy way to find out when the called party gets the message. This can be frustrating for the caller. This can also be annoying for the called party, because the call is terminated without giving the called party an opportunity to respond to the call, except by actually taking the call.

To increase the number of options available to the called party, some call processing systems allow the called party to prerecord a number of outgoing messages. The system can select a specific outgoing message based, for example, on the caller identification, on the time of day, on the date, day of the week, or a combination of these and similar variables.

This feature may also allow the called party to prerecord a detailed personalized message for a particular caller, and store the message in a voice mailbox assigned to the caller. After a call is received and the particular caller is identified, the caller can be routed to the mailbox to receive the personalized message. Based on the nature of the prerecorded message, the caller may, for example, call again at a later time, leave a detailed message for the called party, or simply hang up.

Providing prerecorded personalized messages may be an improvement on the art, but the caller is still left without knowledge of when the called party hears the caller's message. Moreover, because the messages are prerecorded, they do not provide the called party an opportunity to respond to the specific call, except by taking the call; the caller can thus receive a stale message or a message irrelevant under the circumstances. Another potential problem with this scheme is caller misidentification, which may cause a prerecorded message to be played to an unintended recipient.

Quite often situations arise when the called party would prefer to acknowledge the call by providing information that is not carried by a prerecorded message, without, however, engaging in a conversation with the caller. For example, the called party may be busy attending a meeting or engaging in other important matters, but still would like the caller to know that the called party knows about the call. Furthermore, the called party may want to provide the caller with additional information while the caller is still on the telephone, without, however, speaking with the caller. Depending on the circumstances, the called party may also wish to receive the caller's response to the personalized acknowledgement message.

SUMMARY

A need thus exists for call management systems and methods that allow the called party/person to acknowledge the caller before the call is terminated. Another need exists for call management systems and methods that allow the called party to create and transfer a personalized informative message to the caller before the call is terminated. Still another need exists for call management systems and methods that allow the called party to identify the caller before recording a message responsive to the specific call from the caller.

The present invention is directed to methods, apparatus, and articles of manufacture that satisfy one or more of these needs. In one exemplary embodiment, the invention herein disclosed is a method of processing a telephone call from a caller to a person, such as a subscriber of a call management system. According to the method, the person to whom the call is directed is identified and provided with caller information. Caller information is information related to the caller or to the call, so that the called person can make an informed decision whether to take the call, acknowledge the call, or reject the call, based on this information. For example, caller information may include the caller's name and telephone number. The caller information may be obtained using ANI or caller responses. If the called person decides to acknowledge the call, the person sends to the system an acknowledgement indication signifying that the person wants to acknowledge the call, for example, a verbal response of "acknowledge" or "yes." When the system receives the acknowledgement indication, it records a personalized acknowledgement message from the called person to the caller. The personalized acknowledgement message is then played to the caller. After the caller listens to the personalized acknowledgement message, the caller is allowed to leave a message for the called person. The acknowledgement message may also be saved in the voice mailbox of the called person.

In some embodiments, message exchange between the called person and the caller can be extended further. For example, the called person can create a second acknowledgement message in response to the caller's message, and the caller can leave a second message in response to the second acknowledgement. The subsequent acknowledgement messages can also be saved in the voice mailbox of the called person.

These and other features and aspects of the present invention will be better understood with reference to the following description, drawings, and appended claims.

DETAILED DESCRIPTION

Figure 1:
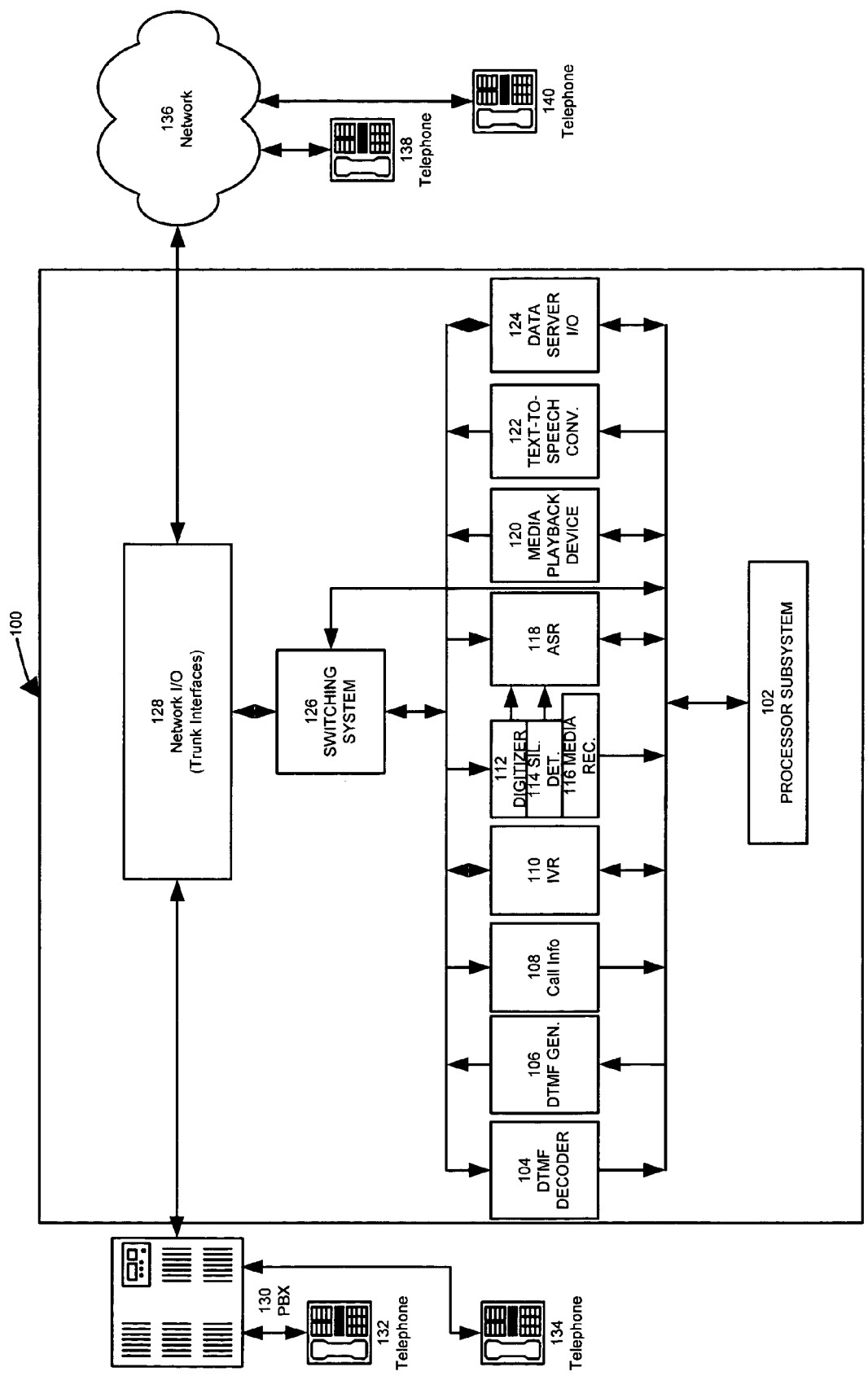
FIG. 1 is a high-level block diagram of a call management system implementing personalized call acknowledgement.

Reference will now be made in detail to several embodiments of the invention that are illustrated in the accompanying drawings. Same or similar reference numerals may be used in the drawings and the description to refer to the same or like items. The drawings are in simplified form, not to scale, and omit apparatus elements and method steps that can be added to the described systems and methods, while including certain optional elements and steps.

In this document, the words "embodiment" and "variant" refer to particular apparatus or process, and not necessarily to the same apparatus or process. Thus, "one embodiment" (or a similar expression) used in one place or context can refer a particular apparatus or process; the same or a similar expression in a different place can refer to a different apparatus or process. The expression "alternative embodiment" and similar phrases are used to indicate one of a number of different possible embodiments. The number of potential embodiments is not limited. The word "subscriber" signifies a person who can receive a call processed by a call management system. Generally, a subscriber has a preexisting association with the system. For example, a subscriber may be an employee of an organization using the call management system. A "caller" is a person who places a telephone call received by the call management system. The call can be placed from a location external to the call management system, or from a location served by the system, such as a telephone extension connected to the system. Note that a "subscriber" can also be a "caller." The words "couple," "connect," and similar expressions with their inflectional morphemes do not necessarily import an immediate or direct connection, but include connections through mediate elements within their meaning. The word "grammar" signifies semantic information of speech, as is understood in the speech recognition context. The scope and spirit of the invention should not be construed as strictly limited to any of these definitions, or to the specific examples mentioned herein, but are intended to include the most general concepts embodied by these and other terms.

Referring more particularly to the drawings, FIG. 1 is a high-level block diagram of a call management system 100 that can be used to implement inventive processes, in accordance with embodiments of the present invention. The call management system 100 includes telephone interfaces 128 that couple the system 100 to a network 136 and to switching equipment 130. In the embodiment illustrated in FIG. 1, the switching equipment 130 is a circuit switched Private Branch Exchange (PBX), while the network 136 is a public switched telephone network (PSTN). In other embodiments, the switching system may be of a different kind, for example, an automated call distributor (ACD). The network 136 can be, for example, the Internet, an intranet, an extranet, a virtual private network (VPN), a local area network (LAN), a wide area network (WAN), an enterprise network, or a private switched network.

As will be illustrated in more detail below, with reference to FIGS. 2A and 2B, a call management system in accordance with embodiments of the present invention may be able to interface simultaneously with several different networks, such as the networks listed above. A call management system may also interface with several different switches. For example, a call management system may be connected at the same time to a public switched telephone network and to the Internet, managing (1) Voice over Internet Protocol (VoIP) calls switched by an Internet Protocol PBX, and (2) PSTN calls switched by a conventional circuit switched PBX.

Returning to the embodiment illustrated in FIG. 1, the telephony interfaces 128 may include analog, digital, and VoIP trunks or stations. A switching matrix 126 is interposed between the telephony interfaces 128 and other components of the call management system 100, selectively connecting inbound and outbound calls between various constituent components of the call management system 100. In addition to the switching matrix 126 and the telephony interfaces 128, the constituent components of the system 100 include a processor subsystem 102, a dual tone multi-frequency (DTMF) decoder 104, a DTMF generator 106, a call information module 108 that provides calling and called party information, an interactive voice response (IVR) module 110, an audio digitizer 112, a silence detector 114, a media (audio) recorder 116, an automatic speech recognition (ASR) module 118, a media (audio) playback device 120, a text-to-speech converter 122, and a data server interface 124.

The processor subsystem 102 may include one or more processors with supporting circuitry and chipsets, such as microprocessors, memories, and interface circuits that are known to a person skilled in the art. In one embodiment, the processor subsystem 102 includes a general purpose microprocessor and a digital signal processor (DSP). The processor or processors of the subsystem 102 execute program code stored in one or more memories. The code may be loaded from another machine-readable medium, such as a CD, DVD, flash memory, floppy or hard drive, or a similar device.

The DTMF decoder 104 detects dual tone multi-frequency signals in telephone calls and generates corresponding signals readable by the processor subsystem 102. For example, an external caller can input DTMF signals from the keypad of the telephone 140 when asked by the IVR module 110 to make a menu selection. In response to the DTMF signals, the processor subsystem 102 may cause the call management system 100 to perform the functions selected by the caller. As will be discussed in more detail in relation to the automatic speech recognition module 118, voice input can be used instead of or in addition to DTMF input.

The DTMF generator 106 generates DTMF signals under control of the processor subsystem 102. For example, the system 100 may generate the DTMF signals to place an external call. An external call may be placed, for example, when the call management system 100 connects an external caller to a subscriber who is not at the subscriber's extension, but who has programmed an external telephone number for forwarding the received calls intended for the subscriber. As another example, the system 100 may need to generate DTMF signals when placing an external call to notify a subscriber regarding messages left for the subscriber. The messages may include, for example, voicemail messages, facsimile messages, email messages, and preprogrammed reminders.

In the illustrated embodiment, the call information module 108 performs two somewhat similar functions. First, the module 108 identifies originating telephone numbers of incoming calls, to identify the caller, for example. Second, it identifies the number or service dialed by the caller. The latter function is useful when multiple telephone numbers are channeled into the same PBX port. The module 108 may obtain call information from a PBX or switching system using, for example, automatic number identification (ANI), dialed number identification system (DNIS), direct inward dial (DID), or other proprietary or non-proprietary means. The call information module 108 converts call signaling information carrying the originating and dialed numbers into signals that can be read by the processor subsystem 102.

The IVR module 110 automates certain interactions between the caller and the system 100. If the caller is a subscriber, the system 100 may use the IVR block 110 to verify the subscriber's identity, and then play received and stored messages intended for the subscriber. The system 100 may also allow the subscriber at a remote location to change answering and forwarding options. For other callers, the system 100 may provide interactive functionality for identifying a proper recipient for the call, and navigating among the various extensions available on the PBX 130. Many other uses for the IVR block 110 will surely occur to a person skilled in the art.

The digitizer 112 converts received analog audio signals into digital form. The silence detector 114 detects silence periods within the digitized signals received from the digitizer 112 or directly from a network. Detecting silence periods may be used to delimit words and phrases in the received speech, before the speech is transferred to the ASR module 118. Silence detection is also useful in reducing the storage needs of the media recorder 116, which may skip (ignore) periods of silence. Examples of silence detectors are described in a commonly owned patent application Ser. No. 10/770,748, entitled Detection of Voice Inactivity Within a Sound Stream, filed on Feb. 2, 2004. Other silence detectors are also known.

The media recorder 116 stores the audio signals, under direction of the processor subsystem 102. For example, the media recorder 116 may record messages left by callers for subscribes of the call management system 100. In one embodiment, the media recorder 116 includes an interface to mass storage devices, such as an interface to a redundant array of inexpensive disks (RAID). The mass storage devices may be a part of the call management system 100, or be separate from the system 100.

The ASR module 118 recognizes spoken words and phrases in audio streams of telephone calls, and generates corresponding signals readable by the processor subsystem 102. The ASR module 118 may be used in conjunction with the IVR module 110 to interpret callers' voice input to the system 100. In response to the menu selections offered by the IVR module 110, a caller can speak the desired selections, such as name or extension number of the called party. The ASR module 118 identifies the name or the extension number (or another selection) from spoken words, and sends corresponding signals to the processor subsystem 102. The processor subsystem 102 then causes the call management system 100 to perform the functions selected by the caller, for example, connecting the caller to the selected person or extension.

The media playback device 120 plays audio files to the callers and subscribers. For example, the playback device 120 may include an interface to the mass storage devices used by the media recorder 116. The playback device 120 can access the messages stored by the media recorder 116, and play the messages to the subscribers upon request and after proper identification.

As implied by its name, the text-to-speech converter 122 converts text into speech. When the call management system 100 is part of a unified communications messaging system, the text-to-speech converter 122 may enable a subscriber at a remote location to access (over a telephone connection) a facsimile message sent to the subscriber and received by the system 100.

The data server interface 124 provides access to various data files that may be used by the system 100 or requested by the subscribers or callers of the system 100. The data available for retrieval through the data server interface 124 may include, for example, subscriber email, contacts, and calendar entries. The data server interface may also store and retrieve customer orders, and provide corporate data to the callers. In one example, the data server interface 124 includes interfaces to Microsoft Exchange® and Lotus Domino® servers.

It should be noted that the various modules illustrated in FIG. 1 can be implemented in hardware, in software, or as a combination of hardware and software components. For example, the DTMF decoding and automatic speech recognition functions of modules 104 and 118 may be performed by the digital signal processor of the processor subsystem 102. The lines dividing the various modules of the call management system 100 in FIG. 1 should therefore be understood as logical dividers used mainly for illustration and ease of description at a relatively high conceptual level.

Figure 2A:
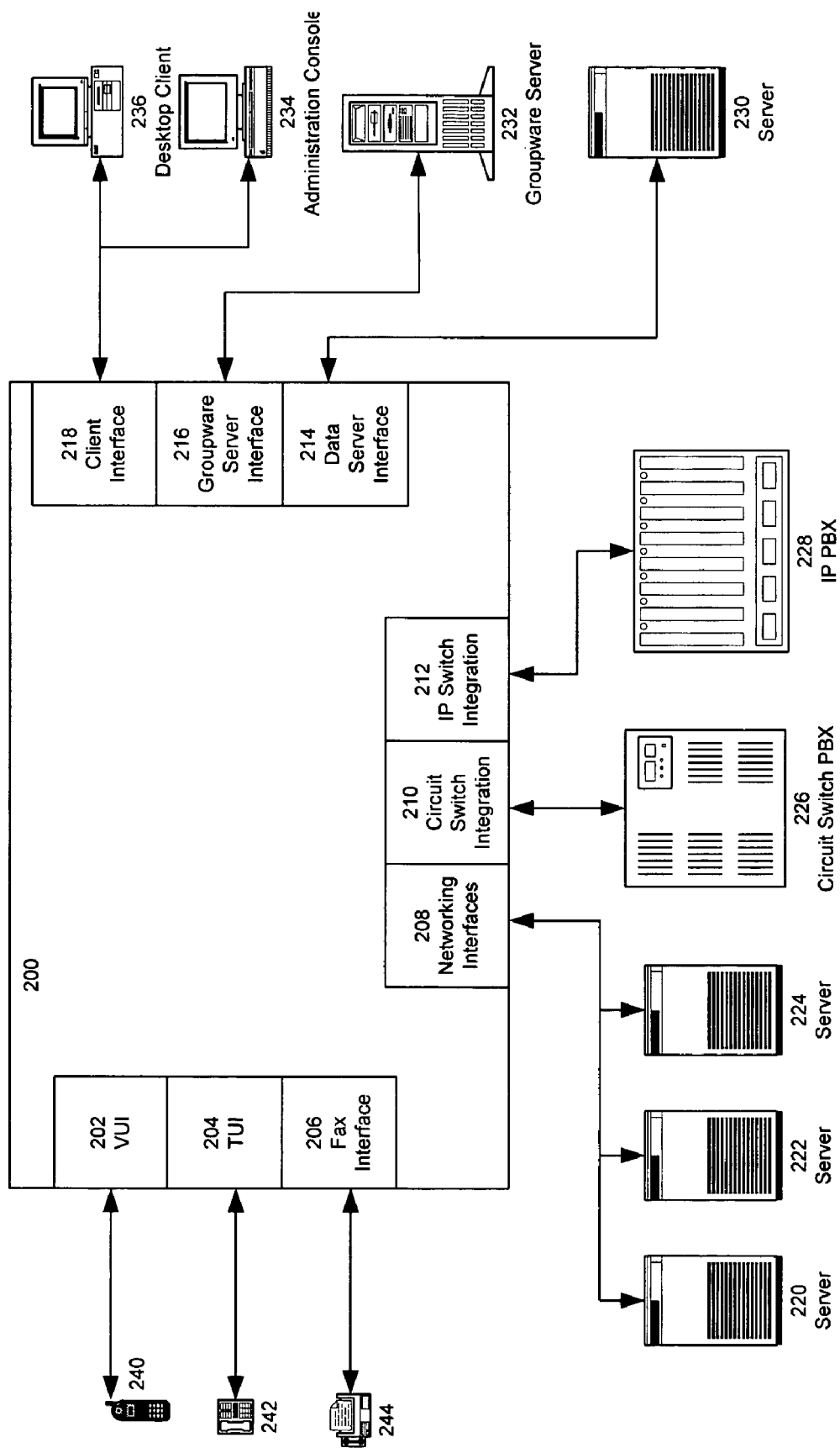
FIG. 2A is high-level block diagram illustrating selected external interfaces of a unified communications system that includes an integrated call management system implementing personalized call acknowledgement.

FIG. 2A is high-level block diagram illustrating selected external interfaces of a unified communications system 200 that includes an integrated call management system, such as the system 100 described above. The interfaces include the following:

1. A voice user interface (VUI) 202, shown connected to a mobile telephone 240; VUI generally uses automatic speech recognition to process input, and is not limited to connecting to and interfacing with mobile telephones.

2. A telephone user interface (TUI) 204, shown connected to a telephone 242, such as a mobile telephone, PBX extension telephone, or a remote landline telephone; TUI generally recognizes DTMF signals used as input means to the system 200.

3. A facsimile interface 206, shown connected to a facsimile machine 244.

4. Networking interfaces 208, shown connected to servers 220, 222, and 224. In one embodiment, the servers 220, 222, and 224 include an Avaya/Octel voice mail server, a Voice Profile for Internet Mail (VPIM)-compliant $3^{rd}$ party server, and a proprietary remote server. The servers 220, 222, and 224 may be used, for example, to transfer voice mail messages between company locations. The networking interfaces 208 include interfaces that correspond to the servers 220, 222, and 224.

5. A circuit switch integration interface 210, shown connected to a circuit switch PBX 226. The interface 210 is similar to the trunk interfaces of the telephony interfaces 128 discussed above in relation to FIG. 1.

6. An Internet Protocol switch integration interface 212, shown connected to an IP PBX 228. The IP PBX 228 switches VoIP calls in a manner similar to the way the circuit switch PBX 226 switches PSTN calls.

7. A data server interface 214 and a groupware server interface 216 couple the system 200 to a data server 230 and to a groupware server 232. The interfaces 214 and 216 provide access to data similar to the data discussed above in relation to the data server interface 124 of FIG. 1. The groupware server 232 generally stores data related to individual subscribers, such as contacts, email, and calendar entries, while the data server 230 stores corporate data.

8. A client interface 218 provides connections to an administration console 234 and desktop client 236. In one embodiment, the console 234 and the desktop client 236 are personal computers running applications for secure data exchange. The data exchange can be web-based.

Figure 2B:
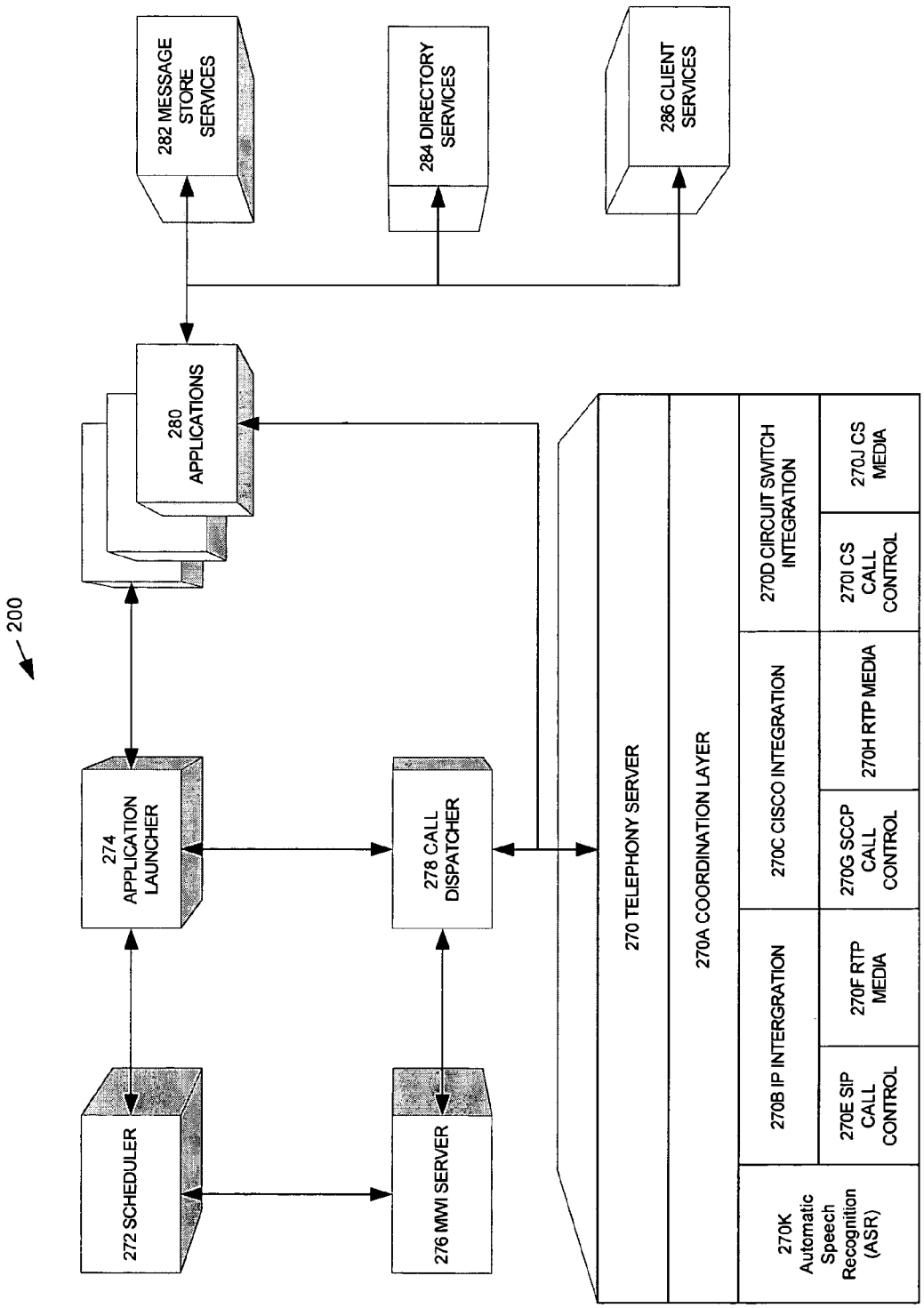
FIG. 2B is a high-level block diagram illustrating selected components of the unified communications system of FIG. 2A.

FIG. 2B is a high-level block diagram illustrating selected software components of the unified communications system 200. Briefly, a telephony server 270 provides interfaces with various hardware devices related to receiving inbound calls and originating outbound calls, transparently using low-level protocols compatible with the hardware devices. Three types of interfaces are illustrated: (1) an IP integration interface 270B for transfer of packetized calls, (2) a CISCO integration interface 270C for IP telephony, and (3) circuit switch integration interface 270D. Each of the integration interfaces includes a call control module (270E, 270G, and 270I), and a media module (270F, 270H, and 270J). Fewer integration modules are present in some embodiments, while other embodiments include additional integration modules. An Automatic Speech Recognition (ASR) module 270K provides speech recognition resources for incoming media streams from media modules 270F, 270H, or 270J. A coordination layer 270B makes the operation of the individual integration interfaces transparent to other components of the unified communications system 200.

A scheduler 272 controls the timetable of various activities of the system 200. For example, it schedules daily maintenance, clearing of message waiting indicators, and call out notifications.

An application launcher 274 starts and monitors other processes of the system 200, including initial startup of the system and dynamic loading.

A message waiting indicator (MWI) server 276 sets and clears message waiting indicators that can be present in telephones and similar devices of some subscribers.

A call dispatcher 278 tracks used and unused telephone lines, and allocates telephone lines to other services.

Message store services 282 provide access to information stored internally in the system 200 or available to the system 200 from externally connected servers, such as the data server 230 and the groupware server 232 of FIG. 2A.

Directory services 284 provide directory information, such as names, mailbox numbers, extension, and other subscriber attributes. In the illustrated embodiment, directory services 284 primarily provide access to a local information store, but also include interfaces to external information stores.

Client services 286 provide callers and subscribers with a single point of entry for connecting to the directory services 284, to message store services 282, and to other applications, e.g., applications 280.

Figure 3:
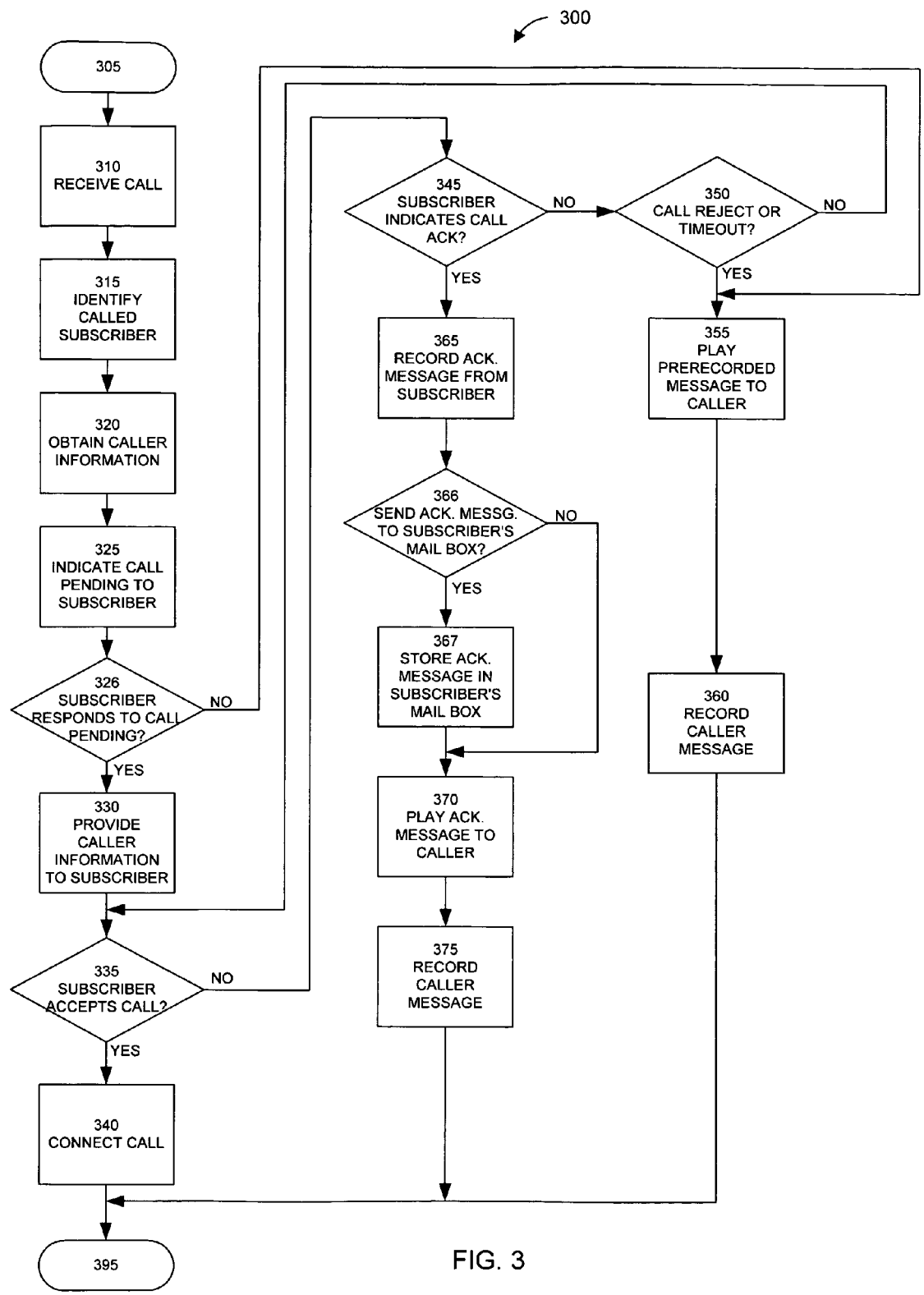
FIG. 3 is a process flow diagram illustrating selected steps and decision blocks of a personalized call acknowledgement process.

Let us now turn to personalized acknowledgement processes performed by the systems described above. FIG. 3 is a process flow diagram illustrating selected steps of one such process 300. Although the process steps are described serially, certain steps can be performed by separate elements in conjunction or in parallel, asynchronously or synchronously, in a pipelined manner, or otherwise. There is no particular requirement that the steps be performed in the same order in which this description lists them, except where explicitly so indicated or otherwise made clear from the context. Furthermore, not every illustrated step is required in every embodiment in accordance with the invention, while some steps that have not been specifically illustrated may be desirable or necessary in some embodiments in accordance with the invention.

Beginning at a flow point 305, a call management system is ready to receive inbound telephone calls. At step 310, the call management system receives a call intended for a subscriber.

At step 315, the call management system identifies the called subscriber. Identification can be done in several ways. For example, if the subscriber has a specific telephone number that the caller has dialed, the call management system can identify the subscriber from the telephone number. In one alternative embodiment, the system asks the caller (e.g., through IVR) to key in the subscriber's extension, and identifies the subscriber from the keyed digits (which are recognized by a DTMF decoder). In another alternative embodiment, the system asks the caller to speak the name of the subscriber, and then uses automatic speech recognition to match the spoken name to stored grammar of the subscriber's name.

At step 320, the call management system obtains caller information. In the present context, caller information is information that can help the called subscriber to make an informed decision whether to take the call, acknowledge the call, or reject the call. For example, caller information may include originating telephone number obtained from an ANI module. The information may include the caller's name provided by the caller in response to a request generated by the call management system. Further, the system can attempt to identify the caller by matching the caller's voice print to voice prints of callers known to call the subscriber, or from another list of callers available to the system. The voice print can be obtained, for example, when the caller identifies the called subscriber or issues voice commands to the call management system.

At step 325, the system indicates to the subscriber that a call has been received and is pending. In one simple case, the system rings the subscriber's telephone.

At decision block 326, the system waits for a predetermined period to allow the subscriber to respond to the notification of a pending call. For example, the system can ring the subscriber's line a number of times, or for a predetermined period. If the subscriber ignores the notification, process flow skips to step 355, where the system plays a prerecorded message to the caller and offers to record the caller's message to the subscriber. At step 360, the system records the callers message, and the process terminates at termination point 395.

If the subscriber responds to the call pending notification, process flow advances to step 330. Here, the system provides caller information to the subscriber. For example, the system can show the caller's telephone number and name on an alphanumeric display of the subscriber's telephone, or on the subscriber's computer screen. In one alternative embodiment, caller information includes the caller's name spoken by the caller, which the system announces to the subscriber using a loudspeaker. The loudspeaker can be, for example, part of the subscriber's telephone device or computer.

In one embodiment, the decision block 326 is eliminated, and the steps 325 and 330 are combined and performed substantially simultaneously. In effect, the step of providing caller information also functions as an indication to the subscriber that a call is pending.

At this point in the process 300, the subscriber has three choices. First, the subscriber can accept the call. Second, the subscriber can acknowledge the call without actually taking the call. Finally, the subscriber can reject the call.

At decision block 335, the system determines if the subscriber wishes to accept the call. In one embodiment, the system uses an interactive voice response module to query the subscriber whether the subscriber wishes to accept the call; the subscriber responds, for example, by saying "yes" or "no" in response to the query. In one alternative embodiment, the subscriber can press a button or click on a pop-up menu to select the desired response. If the system determines that the subscriber wishes to accept the call, process flow proceeds to step 340, in which the system connects the call. The process then completes at the termination point 395.

When the system does not detect that the caller wishes to accept the call, process flow proceeds to decision block 345. Here, the system determines whether the subscriber wishes to acknowledge the call. For example, the subscriber can say "acknowledge" in response to a query or menu item offered by the interactive voice response module. In one embodiment, the subscriber's telephone includes a button that, when pressed, signals the system that the subscriber wants to acknowledge the call. In an alternative embodiment, the subscriber can click on a pop-up menu displayed on the subscriber's computer to provide an indication that the subscriber wishes to acknowledge the call.

If the system does not receive the acknowledgement indication, process flow proceeds to decision block 350 to check whether the call has timed out or has been rejected. The subscriber can reject the call using means similar to those described above in connection with decision boxes 335 and 345, including speaking a voice response to an IVR query, pressing a button, or clicking on a pop-up menu. Timeout can be based, for example, on a timer, or on a number of rings of the subscriber's telephone extension. In some embodiments, the timeout period is programmable by the subscriber. As illustrated in FIG. 3, timeout in effect rejects the call.

Upon call rejection or timeout, process flow proceeds to the step 355, where the call management system plays a prerecorded message to the caller. The system then records the caller's message, which can be subsequently played to the subscriber. This is done in the step 360. The process 300 then completes at the termination point 395.

If the test at the decision block 350 does not indicate call rejection or timeout, process flow goes back to the decision block 335.

Returning to the decision block 345, if the system determines that the subscriber wishes to acknowledge the call, the system proceeds to step 365 to record the subscriber's personalized acknowledgement message to the caller. The system may ask the caller to wait while the subscriber records the personalized acknowledgement message.

In decision block 366, the system determines whether the acknowledgement message should be sent to the subscriber's own voice mailbox. For example, the system checks a flag corresponding to the subscriber's preference to receive a copy of the acknowledgement in the subscriber's voice mailbox. If the flag indicates that the acknowledgement should be copied to the subscriber's mailbox, the acknowledgement is sent to the mailbox, in step 367. This may provide a reminder of the call to the subscriber. Otherwise, step 367 is omitted.

The feature of copying the acknowledgement to the subscriber's mailbox may be made configurable by the subscriber, system administrator, or otherwise.

At step 370, the system plays the personalized acknowledgement message to the caller. Because the caller may want to respond to the acknowledgement, the system offers the caller an opportunity to record a message, at step 375. The process then completes at the termination point 395.

The actual sequence of decision boxes 335, 345, and 350 can be changed, so that these decisions are made in an arbitrary order. Indeed, the three decisions can be combined into one or two selections. For example, the subscriber can be presented with three choices: (1) accept the call, (2) reject the call, or (3) acknowledge the call. The caller can say "accept," "reject," or "acknowledge." Process flow continues to one of the steps 340, 355, or 365, depending on the specific caller selection. A fourth choice is implicit—the choice of not responding to the selections offered; in this case, process flow continues to the step 355 after the timeout period.

An exemplary dialog below illustrates a non-limiting example of the use of the personalized acknowledgement feature. The scenario is that a caller Jane Doe is trying to reach a subscriber John Smith. John Smith is in a meeting, but is expecting Jane's call. The call is sufficiently important to him to interrupt his meeting long enough to leave Jane a personalized message. Without the option of acknowledging Jane's call and providing her with the personalized message, John would have had to take the call and speak to her live, which would have likely resulted in a longer conversation, causing a more substantial interruption of the meeting. If John had chosen not to take the call, Jane's option would have been to leave a message. But Jane would not be really sure when John would find out that she called, or whether he would find out that she called at all.

After hearing John's acknowledgment message, Jane is given an opportunity to leave her message for John. Jane's message can now address not only her original reason for calling, but can also respond to John's acknowledgement message. So John and Jane were effectively able to connect without actually directly talking with each other in real time, moving the interaction beyond the point of Jane simply leaving a message for John.

Table 1 below shows details of the dialog between Jane and John.

TABLE 1

| | Prompt | User Input |
|---|---|---|
| Conversation with Caller (Jane Doe) | Thank you for calling. At any time you may say the first and last name of the person or the name of the department you wish to reach. | "John Smith" |
| | Who's calling please? | "Jane Doe" |
| | One moment please. | |
| | (Transfers to or dials John Smith's extension) | |
| Conversation with User/ Subscriber (John Smith) | You have a call from "Jane Doe" | |
| | Only one of these prompts applies — Would you like to ACCEPT, REJECT, or ACKNOWLEDGE this call? Would you like to ACCEPT, ACCEPT AND RECORD, REJECT, or ACKNOWLEDGE this call? To accept this call, press 1; to reject it, press 2, to accept and record this call, press 9, to acknowledge this call, press 3 Press 1 to accept this call, press 2 to reject it, press 3 to acknowledge it, or simply hang up to allow other Locate options. | "Acknowledge" |
| | Please record a brief message. (maximum 3 minutes, trimmed) | "Hi Jane, I'm in a meeting right now and I can't talk. Please call me back in about 10 minutes" |
| | Message recorded | |
| Conversation with Caller (Jane Doe) | "John Smith" is not available and recorded a brief acknowledgment. "Hi Jane, I'm in a meeting right now and I can't talk. Please call me back in about 10 minutes" Please say LEAVE A MESSAGE, TRY ANOTHER PERSON, or OPERATOR. | "Leave a message" |
| | Please leave your message after the tone. | Spoken message is recorded "John, Thanks for the message. I'm glad you acknowledged my call. I'll call back in 15 minutes. Bye 'til then." |

Figure 4:
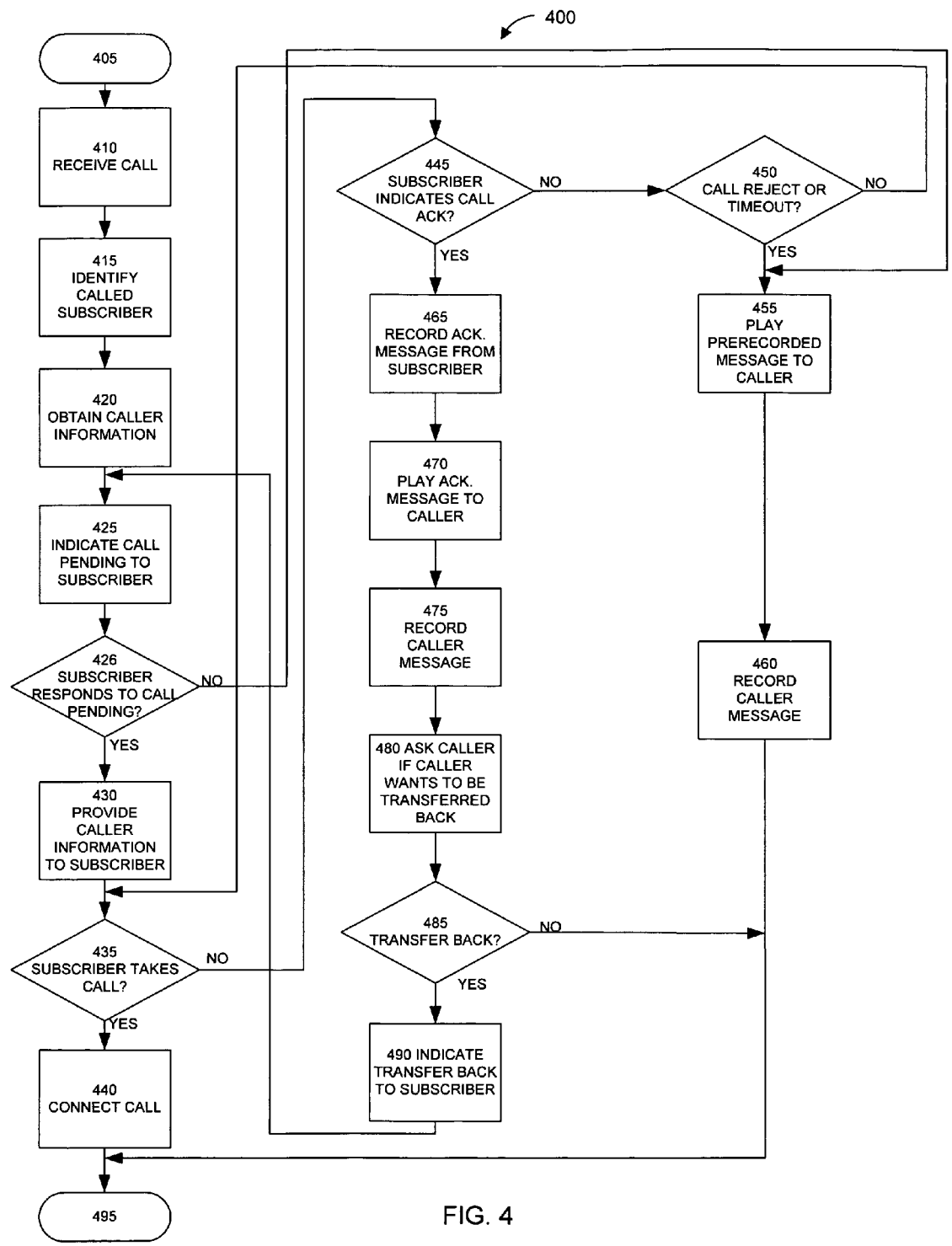
FIG. 4 is a process flow diagram illustrating selected steps and decision blocks of a personalized acknowledgement process with extended message exchange.

Message exchange between the caller and the subscriber can be extended beyond one acknowledgement by the subscriber and one message from the caller. FIG. 4 is a process flow diagram illustrating selected steps of a process 400 enabling such extended message exchange. Although the process steps are described serially, certain steps can be performed by separate elements in conjunction or in parallel, asynchronously or synchronously, in a pipelined manner, or otherwise. There is no particular requirement that the steps be performed in the same order in which this description lists them, except where explicitly so indicated or otherwise made clear from the context. Furthermore, not every illustrated step is required in every embodiment in accordance with the invention, while some steps that have not been specifically illustrated may be desirable or necessary in some embodiments in accordance with the invention.

In the process 400, the call management system receives a call at step 410, identifies the called subscriber at step 415, obtains caller information at step 420, indicates that a call is pending at step 425, waits for the subscriber to respond to the call and provides caller information to the subscriber at decision block 426 and step 430, and determines whether the subscriber wishes to take the call, at step 435. If the system determines that the subscriber wishes to take the call, the call is connected at step 440, and the process terminates at termination point 495. If the system does not detect that the caller wishes to take the call, process flow proceeds to decision block 445, where the system determines whether the subscriber wishes to acknowledge the call. If the system does not receive an acknowledgement indication from the subscriber, process flow proceeds to decision block 450 to check whether the subscriber has rejected the call or whether the call has timed out. Upon rejection or timeout, the system plays a prerecorded message to the caller at step 455, records the caller's message at step 460, and terminates at the termination point 495. If the call has not been rejected or timed out, process flow returns to the decision block 435, where the system determines again whether the subscriber wishes take the call.

If, at decision block 445, the system determines that the subscriber wishes to acknowledge the call, the system proceeds to step 465, to record the subscriber's personalized acknowledgement message to the caller. The caller may be asked to wait while the subscriber records the personalized acknowledgement message. The system plays the personalized acknowledgement message to the caller at step 470. At step 475, the system records the caller's message responsive to the acknowledgement, if the caller chooses to leave such a message.

The steps and decision blocks of the process 400 described in the two immediately preceding paragraphs are identical or analogous to similarly-numbered steps and blocks of the process 300, which were described above in more detail. (Although FIG. 4 does not depict a decision block for determining whether the acknowledgement should be copied to the subscriber's mailbox, and the step of copying the acknowledgement, these flow points can be integrated in the process 400 substantially in the same way as the decision block 366 and step 367 were included in the process 300.) After the step 475, the process 400 diverges from the process 300.

At step 480, the system asks the caller whether the caller wants to be transferred back to the subscriber. This step can be performed using an interactive voice response module. At decision block 485, the system detects the caller's response and determines whether the caller indeed wants to be transferred back to the subscriber. In one embodiment, the system asks the caller to key in the response using telephone keys, and interprets the caller's response using a DTMF detector/decoder. In another embodiment, the system asks the caller to speak the answer, and determines the caller's response using automatic speech recognition.

If the caller does not want to be transferred back, the process completes at the termination point 495. In the case where the caller does want to be transferred back, the system indicates to the subscriber that the call is being transferred, at step 490. Process flow then returns to the step 425, and continues from there in the manner described above. This allows the subscriber to acknowledge the caller's message, and the caller to leave a second message responsive to the second acknowledgement.

As illustrated in FIG. 4, message exchange between the caller and the subscriber can continue indefinitely. In one alternative embodiment, the system limits the number of times that the caller is offered an opportunity to be transferred back. For example, after three message exchanges the caller is no longer offered the opportunity to transfer back.

This document describes the inventive apparatus, methods, and articles of manufacture for personalized call acknowledgement in considerable detail. This was done for illustration purposes only. Neither the specific embodiments of the invention as a whole, nor those of its features limit the general principles underlying the invention. The specific features described herein may be used in some embodiments, but not in others, without departure from the spirit and scope of the invention as set forth. Various physical arrangements of components and various step sequences also fall within the intended scope of the invention. The invention is not limited to the use of specific components, such as the servers mentioned above in relation to FIGS. 2A and 2B. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is carried out by the claims and their equivalents.

We claim:

1. A method of processing a telephone call from a caller, the method comprising:
   identifying a person to whom the call is directed;
   obtaining caller information;
   providing the caller information to the person;
   asking the person whether to accept, reject, or acknowledge the call;
   receiving from the person an acknowledgement indication signifying that the person wants to acknowledge the call, the acknowledgement indication being provided in response to the step of asking;
   recording an acknowledgement message from the person after receiving the acknowledgement indication;
   playing the acknowledgement message to the caller; and
   recording a message from the caller after the step of playing the acknowledgement message;
   wherein the steps of identifying, providing, asking, receiving, recording the acknowledgement message, playing, and recording the message from the caller are performed during the call.

2. A method according to claim 1, further comprising: indicating to the person that the call is pending.

3. A method according to claim 2, further comprising: determining whether the person responds to the step of indicating.

4. A method according to claim 2, further comprising: receiving the call.

5. A method according to claim 4, wherein the step of identifying comprises:
   identifying the person from telephone number dialed by the caller.

6. A method according to claim 4, wherein the step of identifying comprises:
   requesting the caller to input information identifying the person using telephone keys that generate dual tone multi-frequency (DTMF) signals;
   receiving the DTMF signals; and
   decoding the DTMF signals.

7. A method according to claim 4, wherein the step of identifying comprises:
   requesting the caller to speak information identifying the person;
   receiving the information identifying the person spoken by the caller; and
   processing the information spoken by the caller using automatic speech recognition.

8. A method according to claim 7, wherein:
   the step of requesting comprises asking the caller to pronounce name of the person; and
   the step of processing the information comprises matching the information spoken by the caller to stored grammar of the person's name.

9. A method according to claim 7, wherein the step of obtaining caller information comprises:
   comparing the information spoken by the caller to voice prints of known callers; and
   determining name of the caller from a stored record associated with a voice print matching the information spoken by the caller.

10. A method according to claim 4, wherein the step of obtaining caller information comprises:
    using automatic number identification (ANI) information carried by the call to identify telephone number of the telephone from which the call originated.

11. A method according to claim 4, wherein the step of obtaining caller information comprises:
    requesting the caller to speak the caller information; and
    receiving the caller information spoken by the caller.

12. A method according to claim 11, wherein:
    the step of requesting comprises requesting the caller to pronounce name of the caller.

13. A method according to claim 12, wherein the step of obtaining caller information further comprises:
    comparing the caller information spoken by the caller to voice prints of known callers.

14. A method according to claim 4, wherein the step of obtaining caller information comprises:
    receiving voice input from the caller;
    comparing the voice input to voice prints of known callers; and
    determining name of the caller from a stored record associated with a voice print matching the voice input.

15. A method according to claim 4, wherein the step of providing the caller information comprises:
    rendering the caller information through a computer associated with the person.

16. A method according to claim 4, wherein the step of providing the caller information comprises:
    rendering the caller information through a telephone device associated with the person.

17. A method according to claim 4, wherein the step of indicating and the step of providing the caller information are performed substantially simultaneously.

18. A method according to claim 4, further comprising: saving the acknowledgment message in a voice mailbox of the person.

19. A method of processing a telephone call from a caller, the method comprising:
 receiving the call;
 identifying a person to whom the call is directed;
 indicating to the person that the call is pending;
 obtaining caller information;
 providing the caller information to the person;
 receiving from the person an acknowledgement indication signifying that the person wants to acknowledge the call;
 recording an acknowledgement message from the person after receiving the acknowledgement indication;
 playing the acknowledgement message to the caller;
 maintaining a flag indicative of whether the acknowledgement message should be saved in a voice mailbox of the person;
 checking the flag to determine whether the acknowledgement message should be saved in the voice mailbox; and
 if the step of checking determines that the acknowledgement message should be saved in the voice mailbox, saving the acknowledgement message in the voice mailbox.

20. A method according to claim 19, wherein the step of maintaining a flag comprises:
 receiving from the person an indication of whether the acknowledgement message should be saved in the voice mailbox.

21. A method of processing a telephone call from a caller to a subscriber, the method comprising:
 (a) identifying the subscriber;
 (b) obtaining caller information;
 (c) providing the caller information to the subscriber;
 (d) asking the subscriber whether to accept, reject, or acknowledge the call;
 (e) if in response to the step of asking the subscriber indicates within a predetermined period that the subscriber wants to acknowledge the call,
   recording an acknowledgement message from the subscriber,
   playing the acknowledgement message from the subscriber to the caller,
   offering the caller to leave a message to the subscriber, and
   recording the message from the caller to the subscriber if the caller chooses to leave the message to the subscriber;
 wherein each step of the steps of asking, recording the acknowledgement message, playing, offering, and recording the message from the caller is performed during the call.

22. A method according to claim 21, wherein said step (e) further comprises:
 saving the acknowledgment message in a voice mailbox of the subscriber.

23. A method according to claim 22, further comprising:
 (f) indicating to the subscriber that the call is pending.

24. A method according to claim 23, further comprising:
 (g) if the subscriber rejects the call or does not indicate within the predetermined period that the subscriber wants to take the call or acknowledge the call,
   playing a prerecorded greeting to the caller,
   offering the caller to leave a message to the subscriber, and
   recording the message from the caller to the subscriber if the caller chooses to leave the message to the subscriber.

25. A method according to claim 23, further comprising asking the caller whether the caller wants to be transferred back to the subscriber if the subscriber indicates within the predetermined period that the subscriber wants to acknowledge the call.

26. A method of processing a telephone call from a caller to a subscriber, the method comprising:
 (a) identifying the subscriber;
 (b) obtaining caller information;
 (c) providing the caller information to the subscriber;
 (d) if the subscriber indicates within a predetermined period of the caller information being provided to the subscriber that the subscriber wants to take the call, connecting the caller to the subscriber;
 (e) if the subscriber indicates within the predetermined period that the subscriber wants to acknowledge the call,
   recording an acknowledgement message from the subscriber,
   playing the acknowledgement message from the subscriber to the caller,
   offering the caller to leave a message to the subscriber,
   recording the message from the caller to the subscriber if the caller chooses to leave the message to the subscriber, and
   saving the acknowledgment message in a voice mailbox of the subscriber;
 (f) indicating to the subscriber that the call is pending;
 (g) asking the caller whether the caller wants to be transferred back to the subscriber if the subscriber indicates within the predetermined period that the subscriber wants to acknowledge the call; and
 (h) repeating said steps (f), (d), and (e) if the caller indicates that the caller wants to be transferred back to the subscriber.

27. A call management system, comprising:
 a network interface capable of connecting calls between the call management system and a network;
 a call switching system coupled to the network interface to route the calls within the call management system;
 a memory storing program code; and
 at least one processor capable of executing the program code, the at least one processor being capable, under control of the program code, of configuring the call switching system, receiving information from calls, and sending audio information via calls, wherein the processor, under control of the program code, is capable of causing the call management system to perform a method of processing a telephone call according to any one of claims 1-26.

28. An article of manufacture comprising machine-readable storage medium with program code stored in the medium, the program code, when executed by at least one processor of a call management system, being capable of causing the at least one processor to configure the call management system to perform a method of processing a telephone call according to any one of claims 1-26.

* * * * *